United States Patent
Uehashi et al.

(10) Patent No.: US 8,704,493 B2
(45) Date of Patent: Apr. 22, 2014

(54) BATTERY SYSTEM

(75) Inventors: Hiroyuki Uehashi, Kouga (JP); Mamoru Kubo, Isesaki (JP); Koichi Saruhashi, Ora-gun (JP); Hajime Shimayama, Ora-gun (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 276 days.

(21) Appl. No.: 13/025,713

(22) Filed: Feb. 11, 2011

(65) Prior Publication Data

US 2011/0221383 A1    Sep. 15, 2011

(30) Foreign Application Priority Data

Mar. 11, 2010  (JP) ................................ 2010-054256
Jun. 23, 2010  (JP) ................................ 2010-142130

(51) Int. Cl.
*H02J 7/00*    (2006.01)

(52) U.S. Cl.
USPC .............. 320/138; 320/101; 307/64; 307/65; 307/66

(58) Field of Classification Search
USPC .............................. 320/101, 138; 307/64–66
See application file for complete search history.

(56) References Cited

U.S. PATENT DOCUMENTS 8,310,094 B2 * 11/2012 Yamada et al. ................. 307/46
2012/0119581 A1 * 5/2012 Silberbauer et al. ............ 307/66

FOREIGN PATENT DOCUMENTS

| JP | 6-266458 | 9/1994 |
| JP | 06-266458 | * 9/1994 |
| JP | 2002-354677 | 12/2002 |

* cited by examiner

*Primary Examiner* — Richard V Muralidar
(74) *Attorney, Agent, or Firm* — Morrison & Foerster LLP

(57) ABSTRACT

This invention offers an battery system that reduces a conversion loss due to a charger to reduce power consumption. The battery system has a solar battery, a battery module, a bypass route to bypass a charger to charge the battery module with DC power generated by the solar battery, and a control unit to control so that the electric power generated by the solar battery is supplied to the battery module through the bypass route when an output voltage of the solar battery is equal to or higher than a first predetermined voltage, that is higher than a terminal voltage of the battery module, and equal to or lower than a second predetermined voltage.

3 Claims, 7 Drawing Sheets

BATTERY SYSTEM

CROSS-REFERENCE OF THE INVENTION

This application claims priority from Japanese Patent Application No. 2010-54256 and No. 2010-142130, the content of which are incorporated herein by reference in their entirety.

BACKGROUND OF THE INVENTION

1. Field of the Invention

This invention relates to a battery system, specifically to a battery system provided with a generator using a renewable energy as a solar battery, a DC/AC converter, a battery module and the like.

2. Description of the Related Art

This kind of the battery system is to provide a load with electric power by superimposing electric power generated by a solar battery or electric power discharged from a battery module on an indoor alternating current branch, which is supplied electric power from a commercial power grid. Power consumption from the grid can be reduced by an amount of the generated or discharged electric power, and maximum electric power to be supplied from the grid can be reduced as well.

In this case, since the electric power generated by the solar battery and the electric power discharged from the battery module are DC power, they are superimposed on the indoor alternating current branch after being converted into AC power of the same frequency as a frequency of the grid of alternating current through a DC/AC converter (inverter) provided between the solar battery or the battery module and the grid (Refer to Japanese Patent Application Publication No. H06-266458.).

Also, since the electric power generated by the solar battery varies depending on a changing amount of sun light, it is known that the DC/AC converter for solar battery (power conditioner) is provided with a DC/DC circuit that boosts the DC voltage before the DC/AC conversion so that the voltage and the current after the boosting are adjusted so as to maximize the electric power generated by the solar battery (Refer to Japanese Patent Application Publication No. 2002-354677.).

In addition, Japanese Patent Application Publication No. 2002-354677 discloses a structure in which a DC/DC converter (charger) is connected between the battery module and a connecting node between the DC/AC converter (inverter) and the DC/DC circuit (booster circuit) in the power conditioner. The DC/DC converter (charger) is configured to control so that the output voltage of the solar battery outputted through the power conditioner is stepped up or stepped down and outputted to the battery module, or so that the DC power from the battery module is kept stable.

However, an battery system disclosed in Japanese Patent Application Publication 2002-354677 is structured to charge the battery module with the electric power from the solar battery always through the DC/DC converter (charger).

That results in a reduction in charging efficiency due to a conversion loss of the DC/DC converter (charger) always when the solar battery charges the battery module, regardless of states of the solar battery and the battery module.

This invention is directed to solve the problem addressed above, and offers an battery system intended to reduce the conversion loss by the charger to reduce the power consumption.

SUMMARY OF THE INVENTION

This invention is directed to solve the problem addressed above and has a structure described below.

This invention provides an battery system having a DC/AC conversion unit for a generator converting DC power generated by the generator using a renewable energy into AC power of a predetermined frequency and thereafter providing an indoor alternating current line(like a branch) with the AC power, a battery module formed of a plurality of battery cells connected with each other, a charger to charge the battery module using at least either DC power or DC power generated by rectifying AC power obtained through the indoor alternating current line, a DC/AC conversion unit for the battery module converting the DC power charged to the battery module into AC power to provide the indoor alternating current line with the AC power, a bypass route allowing the DC power generated by the generator to bypass the charger to be supplied to the battery module, and a control unit to control charging of the battery module so that the DC power generated by the generator is supplied to the battery module through the bypass route when an output voltage of the generator is equal to or higher than a first predetermined voltage, that is higher than a terminal voltage of the battery module, and equal to or lower than a second predetermined voltage, and that the DC power generated by the generator is supplied to the battery module through the charger when the output voltage of the generator is equal to or lower than the terminal voltage of the battery module.

This invention is further characterized by that the second predetermined voltage corresponds to a voltage indicating full-charge of the battery module.

This invention further provides the battery system, wherein the generator is a solar battery composed of a plurality of solar battery cells connected switchable between series and parallel, and the solar battery cells are connected in series to generate the electric power when an output voltage of the solar battery is equal to or lower than the second predetermined voltage and connected in parallel to generate the electric power when the output voltage of the solar battery is higher than the second predetermined voltage.

DETAILED DESCRIPTION OF THE INVENTION

Figure 1:
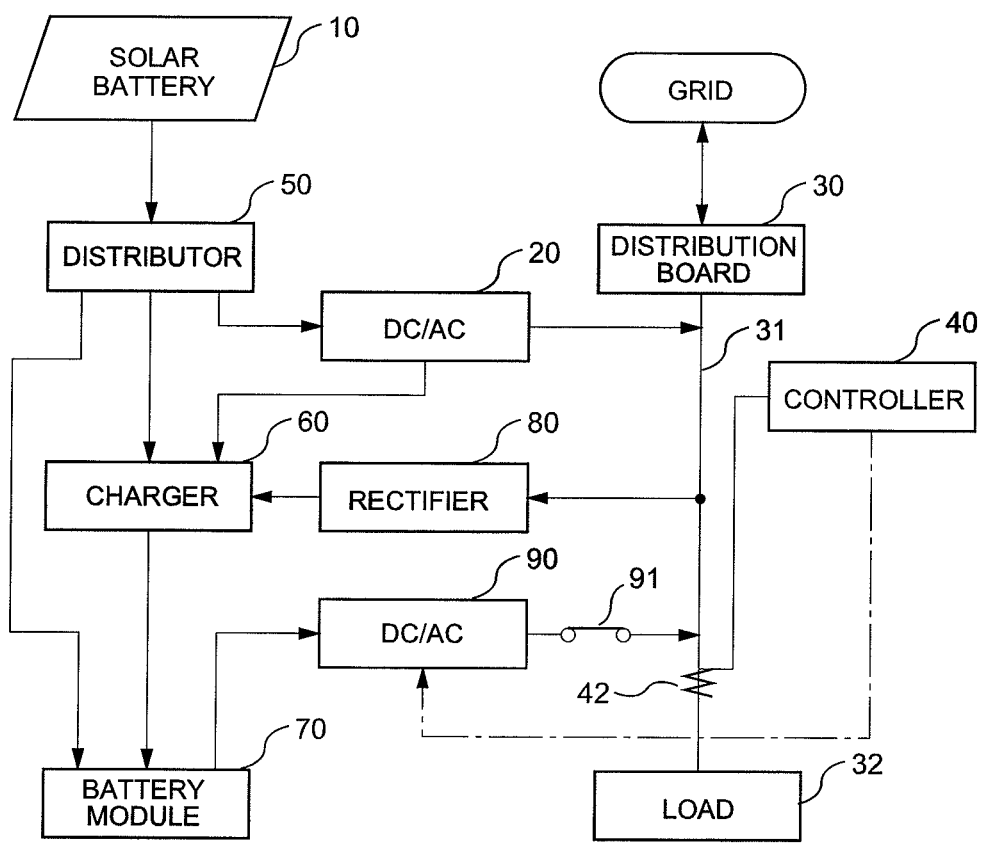
FIG. 1 shows an outline of an overall battery system according to a first embodiment of this invention.

An battery system according to a preferred embodiment of this invention is hereafter described in detail referring to the drawings. Note that each of common components in the drawings is represented by each of common symbols, respectively.

FIG. 1 shows an outline of an overall battery system according to a first embodiment of this invention. A solar battery 10 shown in FIG. 1 is formed of a plurality of solar battery cells connected in series.

DC power generated by the solar battery 10 is supplied to a distributor 50 and then selectively supplied either to a DC/AC converter for solar battery (referred to as a solar inverter) 20 or to a charger 60. The DC/AC converter for solar battery 20 converts the DC power into AC power of predetermined frequency before being superimposed on an indoor alternating current branch 31. The indoor alternating current branch 31 is connected to a power grid through a distribution board 30 having an electric current breaker and the like. The predetermined frequency is a frequency of the power grid (50 Hz or 60 Hz).

A load 32 such as a TV, an air conditioner or a refrigerator, for example, is connected to the indoor alternating current branch 31. A controller 40 shown in FIG. 1 makes a part of a control unit (not shown) and has a function to detect an alternating current supplied to the load 32 with a detector (such as a current transformer) 42 and to calculate power consumption from the detected alternating current and its voltage.

The DC/AC converter for solar battery 20 has a function to perform MPPT (Maximum Power Point Tracking) control to adjust a voltage boosted by a DC/DC converter so that electric power (a product of the voltage and a current) generated by the solar battery 10 is maximized. More detailed explanation on the DC/AC converter for solar battery 20 will be given later.

The battery system has a battery module 70 that stores the electric power generated by the solar battery 10 and supplied to the charger 60 through the distributor 50. The charger 60 is formed of a DC/DC converter or the like, for example, and is configured to step up or step down the voltage outputted from the solar battery 10. The battery module 70 is formed of a lead battery module, a lithium battery or other kind of battery, for example.

In the case of the lithium battery, for example, charging of the battery is performed under a constant current control when a terminal voltage of the battery is equal to or lower than a predetermined voltage, and the charging of the battery is performed under a constant voltage control when the terminal voltage of the battery is higher than the predetermined voltage. Termination of the charging is decided when the terminal voltage reaches a voltage corresponding to a target amount of charging.

The AC power from the indoor alternating current branch 31 is rectified to DC power through a rectifier 80 before being supplied to the charger 60 to charge the battery module 70 in the same way as described above. With this, the battery module 70 can be charged also from the indoor alternating current branch 31 when necessary. That is, the charger 60 is configured to be able to charge the battery module 70 with either the DC power from the solar battery 10 or the DC power obtained by rectifying the AC power from the indoor alternating current branch 31.

The DC power from the battery module 70 is configured to be converted into AC power through a DC/AC converter for battery module 90 before being supplied to the indoor alternating current branch 31 through a switch 91. The AC power is to be superimposed on the indoor alternating current branch 31 after being converted into the AC power of the predetermined frequency, in the same way as being converted by the DC/AC converter for solar battery 20. The predetermined frequency is the frequency of the power grid. The controller 40 outputs a control signal generated based on an output of the detector 42 to the DC/AC converter for battery module 90 so that the electric power outputted from the DC/AC converter for battery module 90 does not exceed the power consumption of the load 32, which is calculated based on the current detected by the detector 42. This prevents an adverse current to the grid being caused by the output from the battery module 70. The DC/AC converter for battery module 90 may have the same structure as the DC/AC converter for solar battery 20, or a partly different structure from the DC/AC converter for solar battery 20. The DC/AC converter for battery module 90 is formed to be independent from the DC/AC converter for solar battery 20. That is, the DC/AC converter for battery module 90 and the DC/AC converter for solar battery 20 are controlled independently from each other by the control unit (not shown). As a result, the electric power conversion in the DC/AC converter for solar battery 20 can be efficiently performed in accordance with the DC/AC converter for solar battery 20, while the electric power conversion in the DC/AC converter for battery module 90 can be efficiently performed in accordance with a terminal voltage of the battery module 70.

Figure 2:
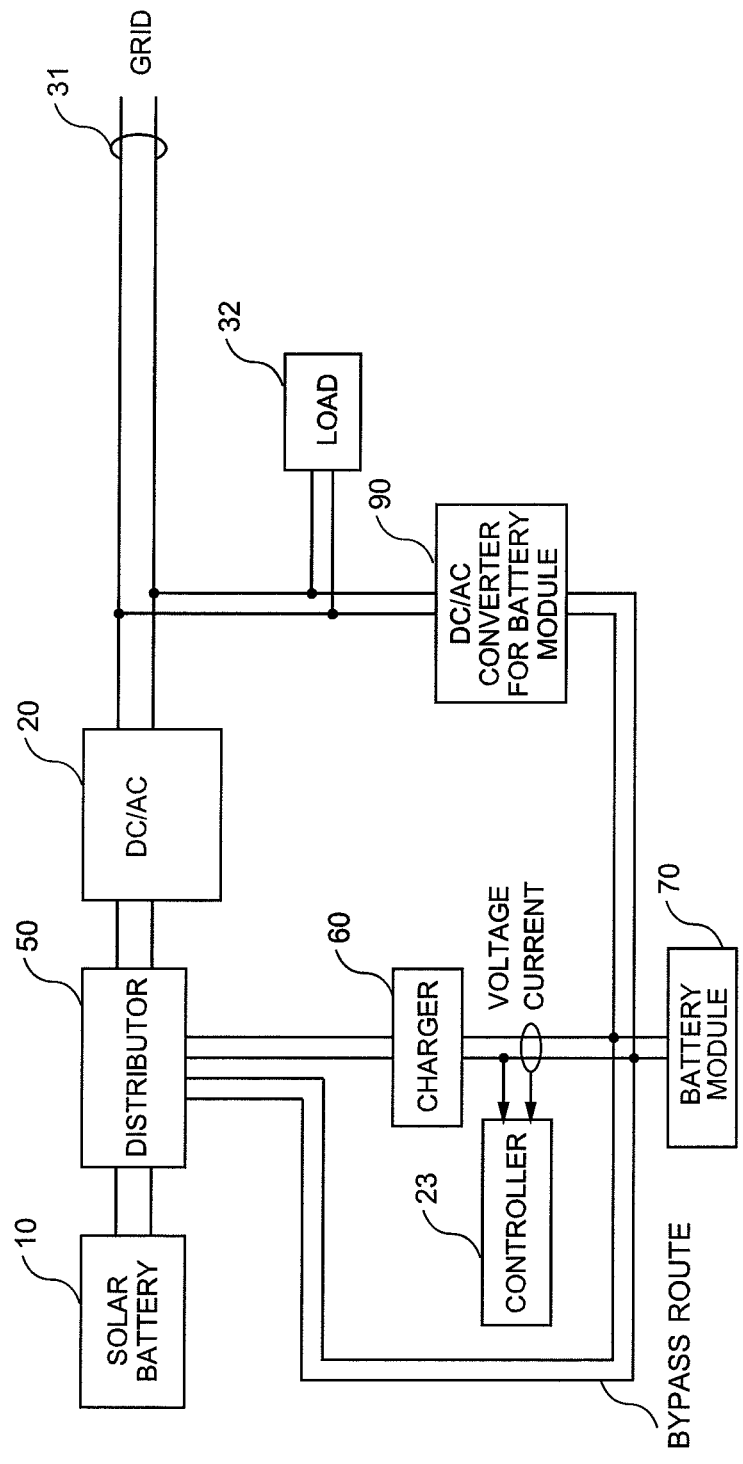
FIG. 2 is a circuit diagram showing an example of charging a battery module with electric power from a solar battery.

FIG. 2 is a circuit diagram showing an example of charging the battery module 70 with electric power of the solar battery 10. When the output voltage of the solar battery 10 is equal to or higher than a first predetermined voltage, that is higher than a terminal voltage of the battery module 70, and equal to or lower than a second predetermined voltage, that corresponds to a voltage indicating that the battery module 70 is fully charged, the distributor 50 directs the output of the solar battery 10 so that the battery module 70 is directly charged with the electric power from the solar battery 10 through a bypass route.

The first predetermined voltage is a voltage higher than the terminal voltage of the battery module 70 by several percents. Although the first predetermined voltage can be set higher when a total output of the solar battery 10 is large enough to a full charge capacity of the battery module 70, it should be set appropriately based on output characteristics of the solar battery 10.

Figure 3:
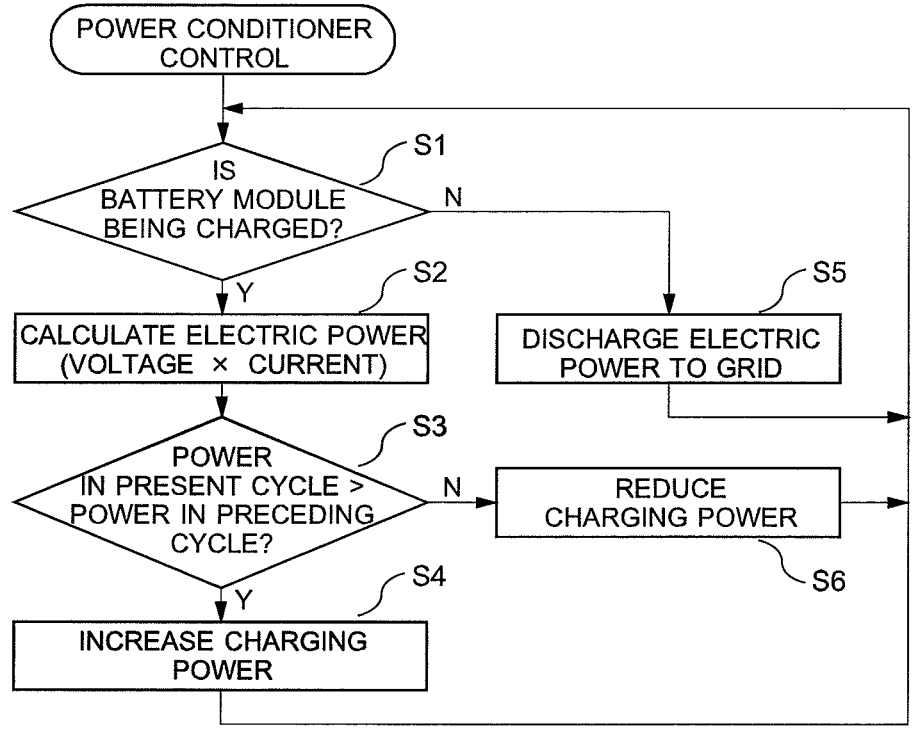
FIG. 3 is an operation flow chart showing a correlation between the charging and an MPPT control in the battery system according to the embodiment of this invention.

The second predetermined voltage corresponds to the voltage indicating that the battery module 70 is fully charged. It may be a voltage corresponding to a voltage regarded as indicating full-charge in design of the battery system. For example, about 90% of actual full-charge of the battery module 70 may be defined as the full-charge in the design. When the output voltage of the solar battery 10 is equal to or lower than the terminal voltage of the battery module 70 or exceeds the voltage indicating the full-charge of the battery module 70, the electric power generated by the solar battery 10 is led to the charger 60 by the distributor 50, and is stepped up or down to a predetermined voltage to charge the battery module 70. In the case the charging is made through the charger 60, the MPPT (Maximum Power Point Tracking) control can be applied to the solar battery 10. The MPPT control is a control to efficiently obtain the maximum electric power corresponding to the electric power generated by the solar battery 10. The MPPT control is to eliminate a drawback in output voltage-output current characteristics of the solar battery 10 that the output current is stable until the output voltage reaches a predetermined voltage and varies steeply when the output voltage exceeds the predetermined voltage, and other drawback that an amount of the electric power generated by the solar battery 10 varies under the influence of the changing amount of sunlight. FIG. 3 shows a sequence of the control.

First, in step S1, whether the battery module 70 is being charged by the DC power from a DC portion of the DC/AC converter for solar battery 20 is judged, as shown in FIG. 3. In the case where the battery module 70 is being charged, a controller 23 detects a voltage and a current from the DC portion of the DC/AC converter for solar battery 20 to calculate DC power (voltage×current) in step S2. In the case where the battery module 70 is not being charged, the sequence goes to step S5 in which the electric power from the solar battery 10 is discharged to the indoor alternating current branch 31. Next, in step S3, the DC power in a present cycle is compared with the DC power in a preceding cycle. When the DC power in the present cycle is larger than the DC power in the preceding cycle, the controller 23 drives an output voltage of the charger 60 upward in step S4. When the DC power in the present cycle is not larger than the DC power in the preceding cycle, the controller 23 drives the output voltage of the charger 60 downward in step S6, and then the sequence returns to the step S1 to repeat the operations thereafter.

In FIG. 1, the DC/AC converter for battery module 90 has a structure identical to that of the DC/AC converter for solar battery 20, for example. However, not limited to the above, the DC/AC converter for battery module 90 may have a different structure. However, the DC/AC converter for battery module 90 and the DC/AC converter for solar battery 20 are controlled independently from each other by the control unit (not shown), as described above. In this case, the DC/AC converter for battery module 90 is structured to operate or to control an amount of conversion so that an amount of current flowing from the indoor alternating current branch 31 to the load 32 does not exceed a predetermined amount of current. The DC/AC converter for battery module 90 is configured to be controlled as described above by the output from the detector 42 through the controller 40.

The control as described above can suppress the adverse current to the grid when the AC power from the DC/AC converter for battery module 90 exceeds the power consumption of the load 32.

Figure 4:
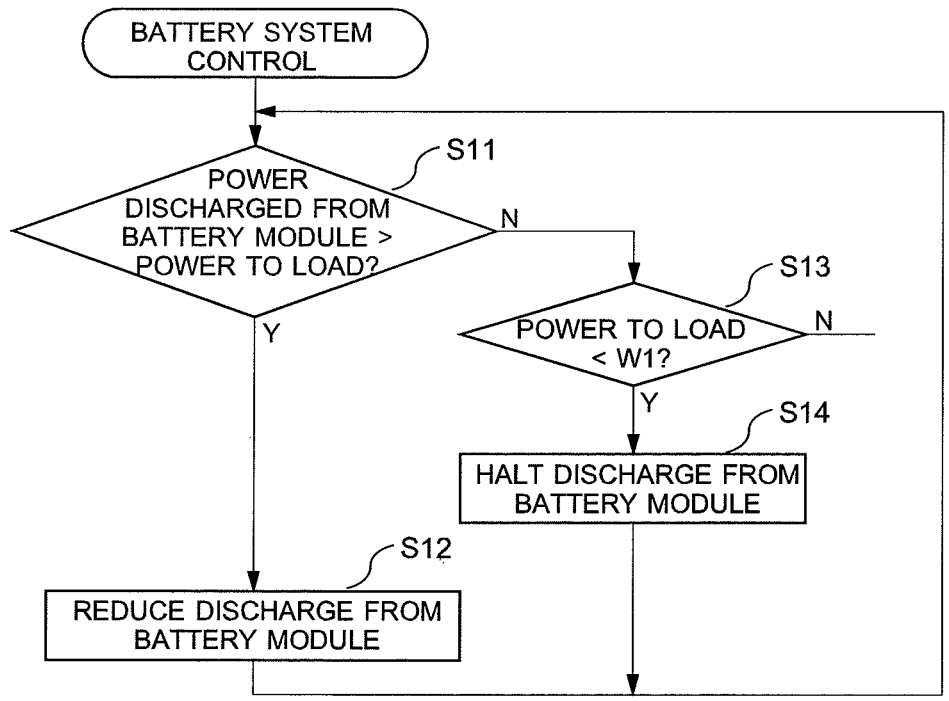
FIG. 4 is an operation flow chart showing the discharging of the battery module to an indoor alternating current branch in the battery system according to the embodiment of this invention.

FIG. 4 is an operation flow chart showing the charging to the battery module 70 and the discharging from the battery module 70 to the indoor alternating current branch 31 in the battery system structured as described above.

First, electric power from the battery module 70 and AC power supplied to the load 32 are compared in step S11, as shown in FIG. 4. The electric power supplied from the DC/AC converter for battery module 90 to the indoor alternating current branch 31, for example, is used as the electric power from the battery module 70, and the electric power detected by the detector 42, for example, is used as the AC power supplied to the load 32. When the AC power supplied to the load 32 is less than the electric power from the battery module 70, an amount of discharge from the battery module 70 is reduced in step S12. The amount of discharge can be reduced by changing a PWM (Pulse Width Modulation) signal in the inverter circuit so as to reduce a voltage of a quasi sine wave, for example. When the AC power supplied to the load 32 is not less than the electric power from the battery module 70, the sequence moves to step S13 described below. In the step S13, the AC power supplied to the load 32 is compared with a constant value W1. W1 represents a substantial minimum amount of discharge from the battery module 70 when discharging efficiency and the like are taken into consideration. When the AC power supplied to the load 32 is less than the constant value W1, the discharging from the battery module 70 is halted in step S14. When the AC power supplied to the load 32 is not less than W1, the battery module 70 continues discharging. After that, the sequence returns to the step S11 to repeat the operations described above.

In the battery system structured as described above, the DC/AC converter for solar battery 20 and the DC/AC converter for battery module 90 are formed to be separate from each other and controlled independently from each other. As a result, the direct current from the solar battery 10 as well as the direct current from the battery module 70 can be efficiently converted into the alternating current.

In the embodiment described above, when the battery module 70 is to be charged with the DC power from the solar battery 10, the DC/AC converter for solar battery 20 is structured to be able to output the direct current from its DC portion to charge the battery module 70, or the distributor 50 supplies the direct current from the solar battery to the charger 60, as shown in FIGS. 1 and 2.

Figure 5:
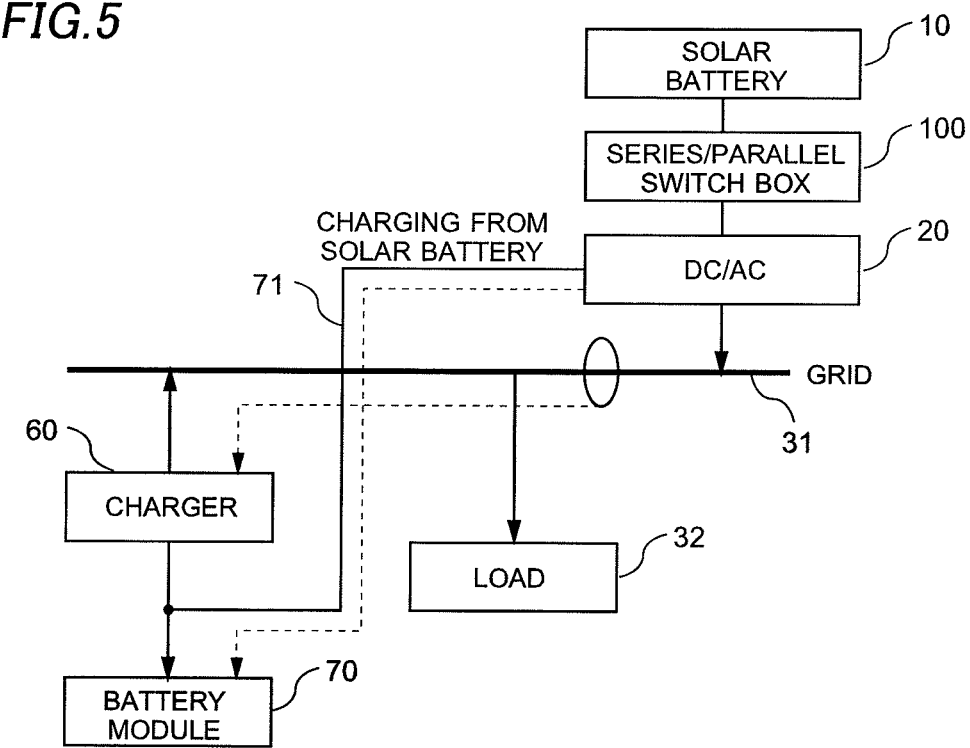
FIG. 5 shows a battery system according to a second embodiment of this invention.

However, as shown in FIG. 5, the DC/AC converter for solar battery 20 may be structured so that the DC power from the DC portion charges the battery module 70 without going through the charger 60 (bypassing the charger 60) under certain conditions. In this case, a route through which the battery module 70 is directly charged from the DC portion of the DC/AC converter for solar battery 20 is referred to as a bypass route 71 in this specification. Note that only the solar battery 10, the DC/AC converter for solar battery 20, the charger 60, the battery module 70 and the load 32 are excerpted from FIG. 1 and shown in FIG. 5. FIG. 5 also shows a series/parallel switch box 100 that is not shown in FIG. 1. However, the series/parallel switch box 100 may be not included.

The battery system structured as described above has effects that a loss due to the DC/AC converter for solar battery 20 and a conversion loss due to the charger 60 can be reduced to reduce power consumption in the system in which the battery module 70 is charged from the solar battery 10.

Figure 6:
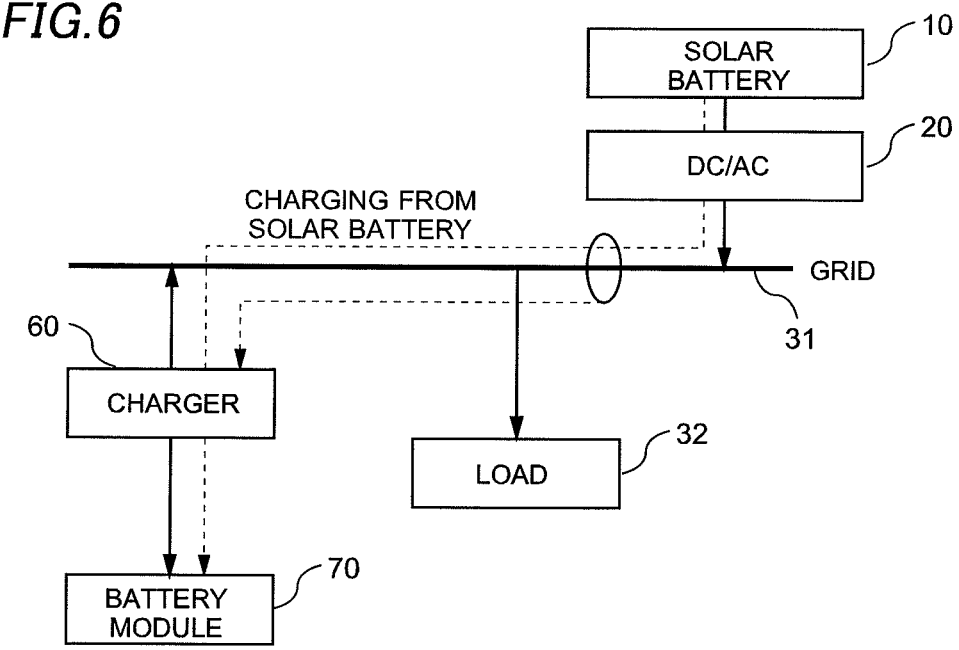
FIG. 6 is to demonstrate effects of this invention and shows an example of imaginary case in which a structure shown in FIG. 5 is not applied.
Figure 7:
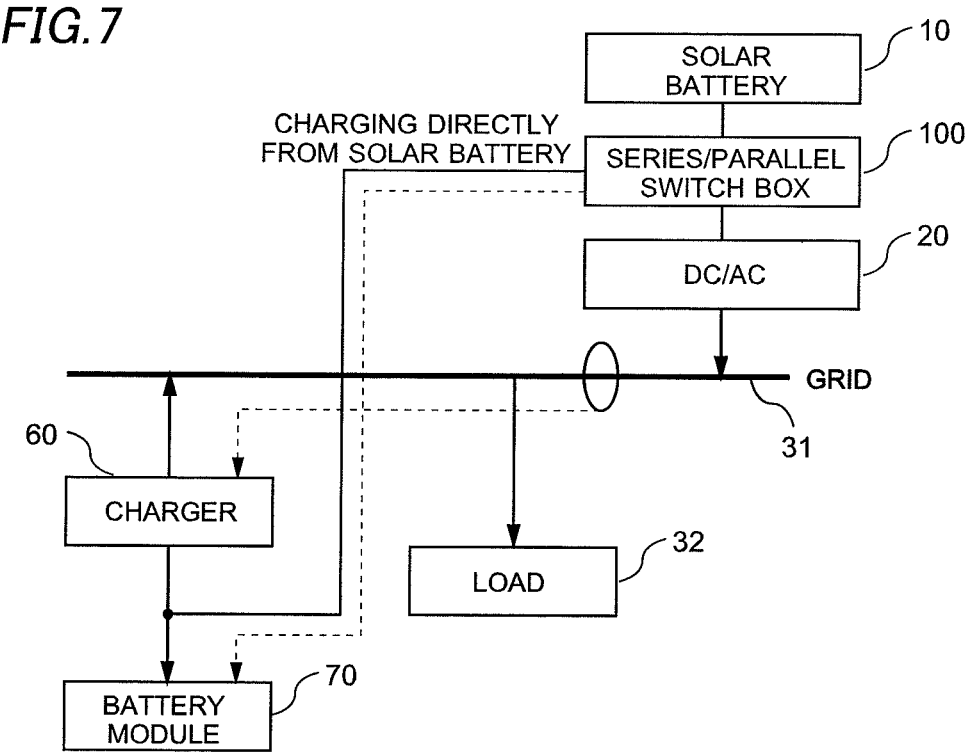
FIG. 7 is to demonstrate the effects of this invention and shows another example of imaginary case in which the structure shown in FIG. 5 is not applied.

FIG. 6 shows an battery system in relation to the system shown in FIG. 5, assuming the case in which the battery module 70 is charged with the electric power from the solar battery 10 through the DC/AC converter for solar battery 20 and the charger 60. In this case, the electric power to charge the battery module 70 from the solar module 10 inevitably suffers from a substantial conversion loss due to the conversion by the DC/AC converter for solar battery 20 and the charger 60. FIG. 7 shows an battery system in which the electric power from the solar battery 10 is taken out from an output side of the series/parallel switch box 100 and inputted to the battery module 70, assuming the case in which the electric power from the solar battery 10 charges the battery module 70 without going through the DC/AC converter for solar battery 20 or the charger 60 in order to avoid the conversion loss.

It is apparent from comparison between the structures shown in FIG. 6 and FIG. 7 that the conversion loss in the electric power charged to the battery module 70 can be reduced with the structure shown in FIG. 5.

Also, in order to make the charging to the battery module 70 more efficient, control as described below is performed by the control unit (not shown) in the battery system shown in FIG. 5. That is, when the output voltage of the solar battery 10 is equal to or higher than the first predetermined voltage, that is higher than the terminal voltage of the battery module 70, and equal to or lower than the second predetermined voltage, that corresponds to the full-charge voltage of the battery module 70, the solar battery 10 and the battery module 70 are directly connected through the bypass route 71 to charge the battery module 70. Also, when the output voltage of the solar battery 10 is equal to or lower than the terminal voltage of the battery module 70 or higher than the full-charge voltage of the battery module 70, the battery module 70 is charged not through the bypass route 71 but through the charger 60. The battery module 70 is made of a plurality of battery cells connected in series, and is structured so that a voltage across each of the cells can be detected and at least an overvoltage and overcharging of the battery cell, a temperature of the battery module 70 and charging/discharging current to/from the battery module 70 can be detected. In this case, the full-charge voltage can be judged by a charging voltage of the DC power applied from outside to the battery module 70.

Figure 8:
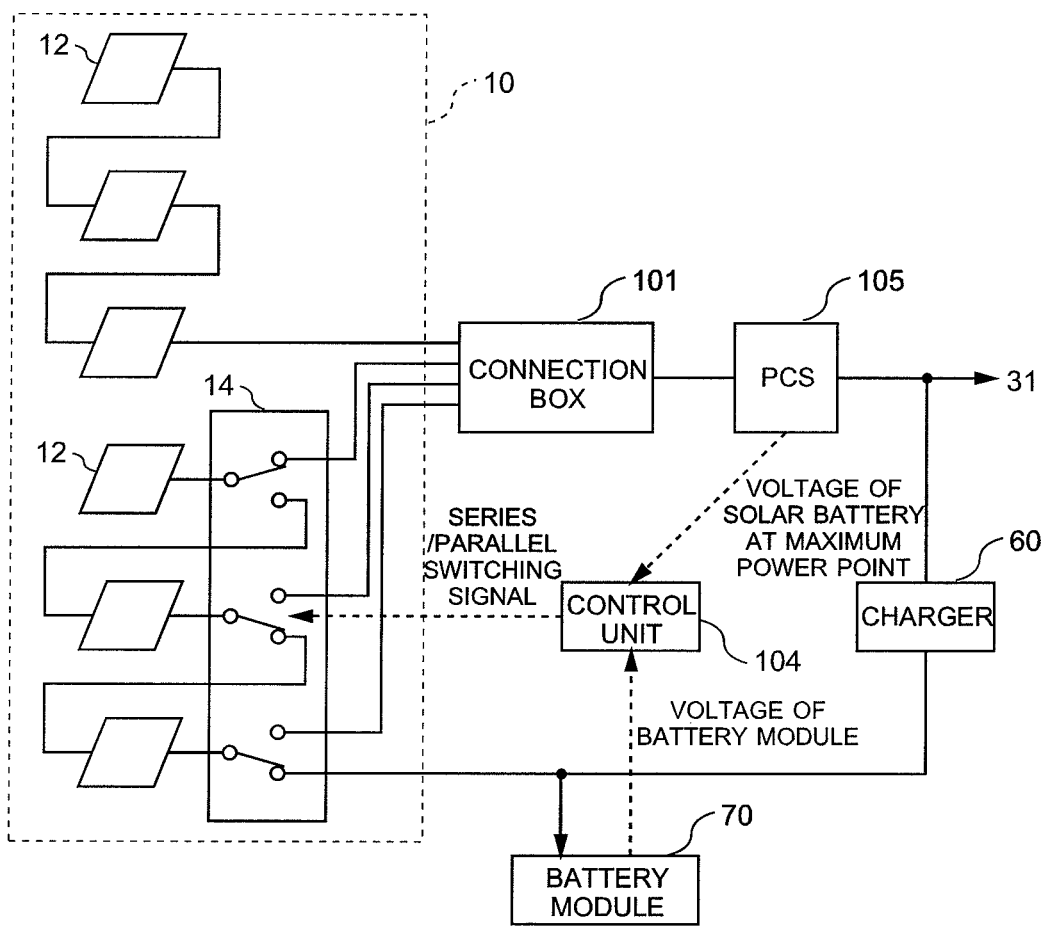
FIG. 8 shows a structure further improved from the structure shown in FIG. 5.

FIG. 8 shows a structure capable of performing efficient charging based on a maximum power point in the DC/AC converter for solar battery 20 and the terminal voltage of the battery module 70, when the solar battery 10 and the battery module 70 are directly connected to charge the battery module 70 directly in the structure shown in FIG. 5.

As shown in FIG. 8, the solar battery 10 is composed of a plurality of solar battery cells 12. Some of the solar battery cells 12 (those shown in upper portion in FIG. 8) are connected in series and provide a connection box 101 with electric power. Rest of the solar battery cells 12 (those shown in lower portion in FIG. 8) provide the connection box 101 with electric power through a group of switches 14. Each of the switches 14 is turned on and off by a signal from a control unit 104, that is to be described, so that an arbitrary number (n) of the solar battery cells 12 (or a plurality of solar battery cells 12 connected in parallel) can be connected in series. Electric power from the arbitrary number of solar battery cells 12 connected in series charges the battery module 70 directly.

The connection box 101 is connected to the indoor alternating current branch 31 through a PCS 105. The PCS 105 outputs the electric power of the solar battery 10 to the indoor alternating current branch 31 at a predetermined ratio of coordination with the electric power in the indoor alternating current branch 31, and is formed to include the DC/AC converter for solar battery 20. The AC power from the indoor alternating current branch 31 also serves to charge the battery module 70 through the charger 60.

The control unit 104 makes a part of the control unit mentioned in the explanation on FIG. 1 although not shown in the drawing, and is capable of detecting the maximum power point in the DC/AC converter for solar battery 20 in the PCS 105 and the terminal voltage of the battery module 70. The control unit 104 makes calculations based on the maximum power point of the DC/AC converter for solar battery 20 and the terminal voltage of the battery module 70, and controls turning on/off of each of the group of switches 14 based on the results of the calculations. With this, the voltage to charge the battery module 70 can be set by the number of solar battery cells 12 connected in series.

Figure 9:
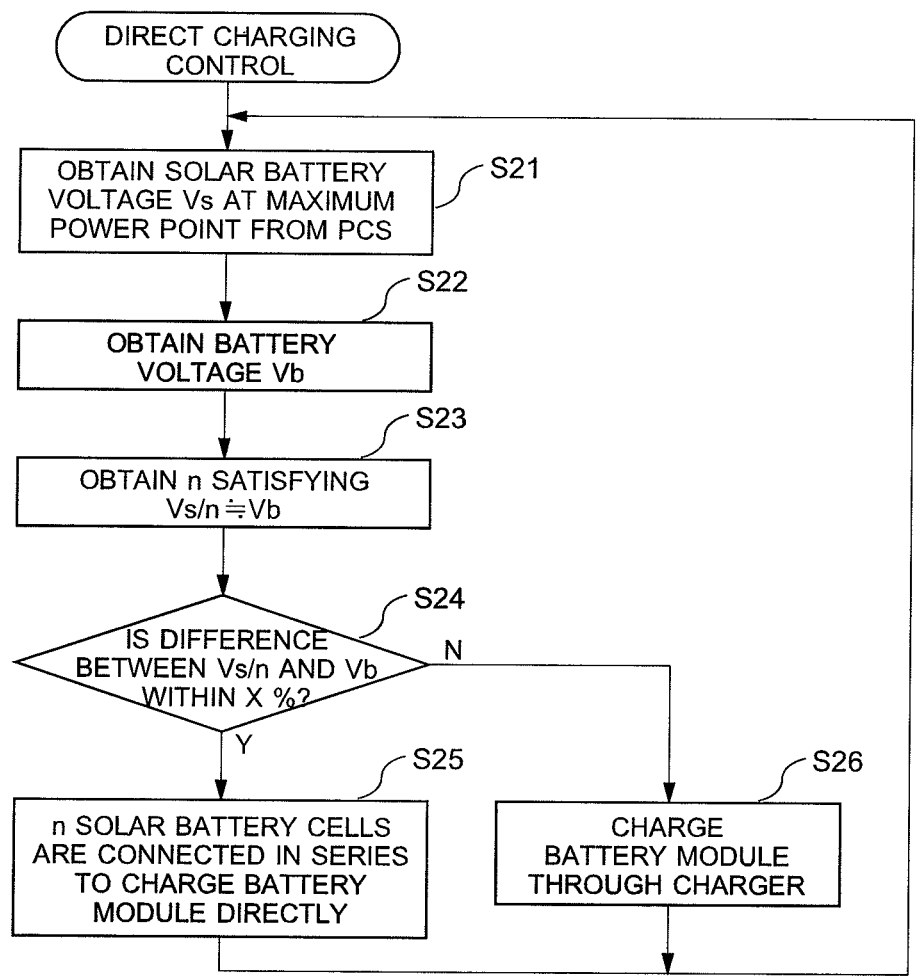
FIG. 9 is an operation flow chart of a control unit shown in FIG. 8.

FIG. 9 is an operation flow chart showing operations in the control unit 104. First, in step S21, the control unit 104 obtains from the PCS 105 a voltage Vs at the maximum power point out of the voltage of the solar battery 10, as shown in FIG. 9. Next, in step S22, the terminal voltage (battery voltage) Vb of the battery module 70 is detected from the battery module 70. Next, in step S23, the control unit 104 obtains n that satisfies Vs/n>Vb and makes Vs/n closest to Vb, based on the detected voltage Vs and the terminal voltage Vb. Further, in step S24, the control unit 104 judges whether a difference between Vs/n and Vb is within X % of Vb. X is a predetermined value that is set according to how efficiently the charging is to be performed. When the difference between Vs/n and Vb is within X %, n solar battery cells 12 in the solar battery 10 are connected in series, and electric power generated by the n solar battery cells 12 connected in series is supplied to the battery module 70 without going through the charger 60 to charge the battery module 70 in step S25. After that, the sequence returns to the step S21 to repeat the operations described above. When it is judged in the step 24 that the difference between Vs/n and Vb is not within X %, the battery module 70 is charged through the charger 60 in step S26. After that, the sequence returns to the step S21 to repeat the operations described above.

Since the electric power from the solar battery 10 directly charges the battery module 70 without going through the charger 60 under certain conditions in the battery system structured as described above, the conversion loss due to the charger 60 can be reduced to suppress the reduction in the efficiency of charging.

The preferred embodiments of this invention have been described in detail. However, this invention is not limited to the embodiments described above, and may be modified or changed variously within the scope of this invention.

With the battery system structured as described above, the conversion loss due to the charger can be reduced to suppress the reduction in the efficiency of charging.

What is claimed is:

1. A battery system comprising:
   a DC/AC conversion unit for a generator converting DC power generated by the generator using a renewable energy into AC power of a predetermined frequency and supplying the AC power to an indoor alternating current line;
   a battery module comprising a plurality of battery cells connected with each other;
   a charger charging the battery module with either DC power generated by the generator or DC power generated by rectifying AC power obtained through the indoor alternating current line;
   a DC/AC conversion unit for the battery module converting electric energy stored in the battery module into AC power and supplying the AC power to the indoor alternating current line;
   a bypass route bypassing the charger so that the DC power generated by the generator is supplied to the battery module directly; and
   a control unit controlling charging of the battery module so that the battery module is supplied with the DC power generated by the generator through the bypass route when a voltage of the DC power outputted from the generator is equal to or higher than a first predetermined voltage, that is higher than a terminal voltage of the battery module, and equal to or lower than a second predetermined voltage, and that the battery module is supplied with the DC power generated by the generator through the charger when the voltage of the DC power outputted from the generator is equal to or lower than the terminal voltage of the battery module,
   wherein the generator is a solar generator that generates only DC power.

2. The battery system of claim 1, wherein the second predetermined voltage corresponds to a voltage indicating that the battery module is fully charged.

3. The battery system of claim 2, wherein the generator comprises a solar battery comprising a plurality of solar battery cells connected switchable between series and parallel, the solar battery cells being connected in series when an output voltage of the solar battery is equal to or lower than the second predetermined voltage, and the solar battery cells being connected in parallel when the output voltage of the solar battery is higher the second predetermined voltage.

* * * * *